United States Patent [19]

Liebel

[11] 4,386,881
[45] Jun. 7, 1983

[54] SIDE LOAD SPACER
[75] Inventor: Henry L. Liebel, Cincinnati, Ohio
[73] Assignee: Angleboard Inc., Cincinnati, Ohio
[21] Appl. No.: 253,771
[22] Filed: Apr. 13, 1981
[51] Int. Cl.³ .............................................. B61D 45/00
[52] U.S. Cl. ..................................... 410/154; 410/121
[58] Field of Search ....................... 410/121, 154, 155; 206/516, 593, 504

[56] References Cited
U.S. PATENT DOCUMENTS 3,405,659 10/1968 Hees ..................................... 410/154
3,581,675  6/1971 Kauffman ............................ 410/155

OTHER PUBLICATIONS

Brochure entitled "Void Filler".

Primary Examiner—Robert B. Reeves
Assistant Examiner—Donald Hajec
Attorney, Agent, or Firm—Wood, Herron & Evans

[57] ABSTRACT

A load spacer is disclosed for filling the void between containers or articles in a railway boxcar or other freight shipping vehicle or container and the sides thereof to prevent shifting of the load. The load spacer is an expandable, collapsible honeycomb structure which includes a generally planar suspension member laminated to the top of the honeycomb structure. The suspension member includes side portions extending laterally beyond either side of the honeycomb structure and is provided with a score line permitting one side portion to be bent to a position generally perpendicular to the top surface of the suspension member. This side portion includes a pair of flaps which are bendable inwardly over the top surface of the suspension member to prevent the one side portion from being bent beyond the perpendicular. In use, the other side portion rests on the top of the article of freight while the side portion bent into the perpendicular relationship lies against the vertical side wall of the container. This relationship prevents the load spacer from falling down between the load and the side wall of the vehicle during use. A bendable wire runs along the length of the one side portion of the suspension members having the flaps to hold the flaps in their inwardly bent position during use.

8 Claims, 2 Drawing Figures

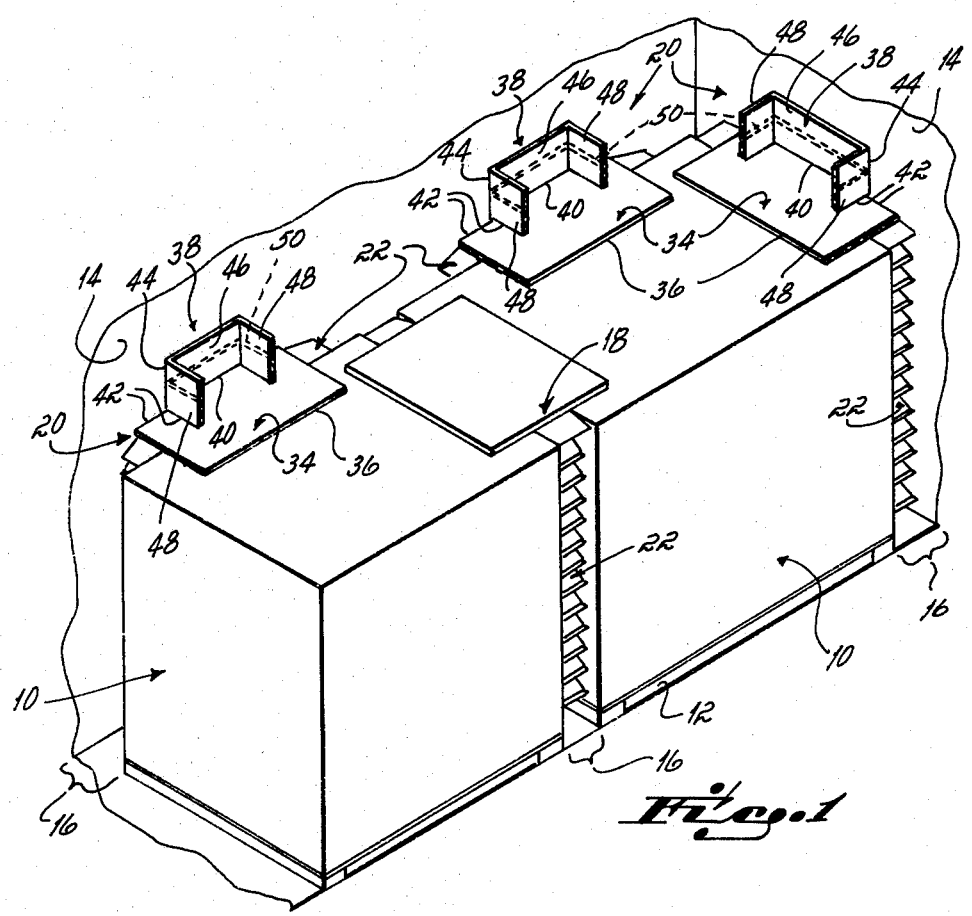
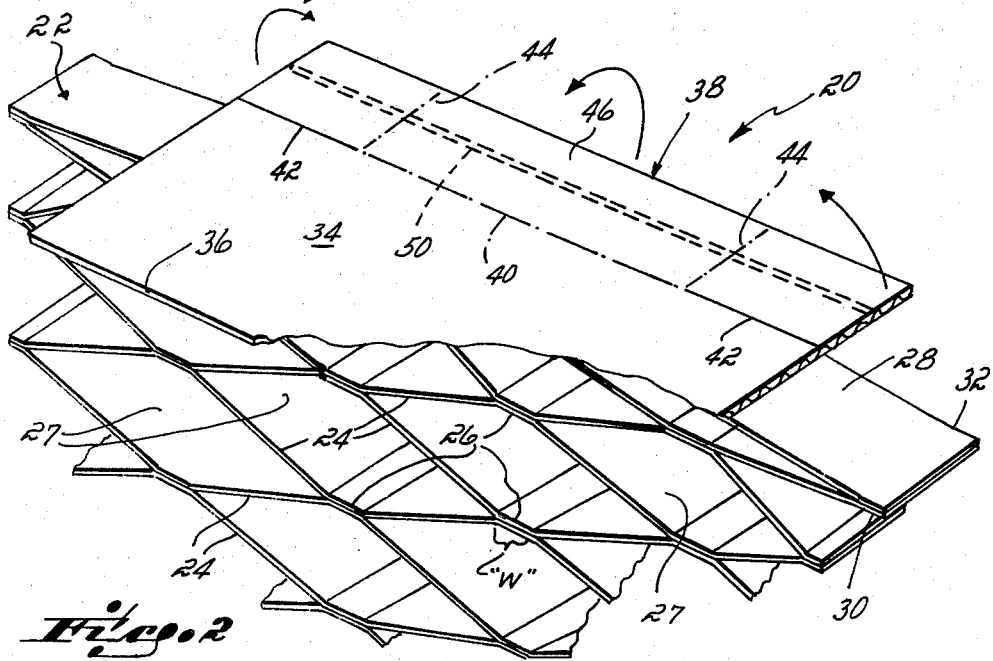

SIDE LOAD SPACER

BACKGROUND OF THE INVENTION

This invention relates to a load spacer for filling the void between articles or containers of freight and the side walls of the vehicle or container containing the freight which may be collapsed to a compact package for shipment or storage but can be readily expanded for use. More particularly, this invention relates to an improved suspension system for suspending the load spacer between articles of freight and the sides of the freight-containing container.

In the loading of a freight container such as a railway boxcar or other freight shipping vehicle or container, it frequently happens that the loads placed therein do not completely fill up the available storage space. Thus, there are left one or more vertical spaces between unit loads of goods and the walls of the shipping container. These spaces should be filled to prevent side shifting of the loads during transit which could cause damage to the load. In some instances, it is desired to space the load from the walls of the shipping container, for example, to prevent the load from contacting the rough walls of the container or nails or splinters in the wall and possibly being torn open.

Prior to the present invention, various forms of load spacers or void fillers have been proposed for filling the vertical spaces between closely spaced adjacent unit loads of goods. One particular form of load spacer is the collapsible, honeycomb structure in which a stack of rectangular strips of sheet material, for example, corrugated paperboard are glued to adjacent strips at spaced and staggered positions such that when expanded the strips define a honeycomb structure having a plurality of cells. These load spacers typically include provision for suspending the spacer either from the roof of the container or from the tops of a pair of spaced articles of freight. The honeycomb structure then expands downwardly between the articles under its own weight, or it is pulled downwardly to the bottom of the stack. When no longer needed, the load spacer may then be removed and stored in the collapsed condition for later use. Patents representative of this state of the art include U.S. Pat. Nos. 3,862,607; 3,842,757; 3,823,675; 3,618,535; and 3,593,671.

Although prior workers have addressed themselves to the problem of suspending the load spacer between the articles of freight, a particular problem that has continued to plague the art has been to provide a load spacer for use between an article of freight and the vertical side wall of the container in which the freight is placed. That is, in such systems as those shown in U.S. Pat. Nos. 3,618,535; 3,593,671; and 3,842,757, wood slats are provided at the top of the load spacer which extend laterally beyond the sides of the load spacer. The load spacer is then suspended between the closely adjacent spaced loads with the portions of the wood slats extending beyond the sides of the spacer resting on the tops of the loads on either side of the spacer. However, these systems cannot be used at the ends or sides of the load since it is impossible to suspend the spacer by cantilevering one end of the suspension member from the top of the load of freight. Moreover, the vehicle and contained load vibrate during transportation such that the load spacer inserted between the load and side wall of the container tends to fall therebetween and collapse.

One possible solution is to insert hanger wires through two top cells of the load spacer with the wires then being hooked to the top of the load itself or to an overhead rail on the side or top of the container. Such load spacers, however, have disadvantages in that the wires are sometimes difficult to work with, they require provision of an overhead suspension rail, they add expense to the load spacer, they increase the difficulty of shipping stacks of load spacers, they must be attached to the container or to the load before the load is put in place, and they generally increase the difficulty in placing and suspending the load spacer during loading of the freight containing vehicle. Another proposed solution is to take a center load spacer, fold back one side thereof and actually nail it to the wall of the container. This system suffers from the obvious disadvantage that the installer must actually nail the load spacer to the container. In addition to their use being limited to containers having wooden walls, they greatly increase the time for installing the load spacer as well as making its removal difficult. Moreover, after a number of nailings, such load spacers are no longer usable.

SUMMARY OF THE INVENTION

An objective of the present invention has been to provide an improved suspension system for a load spacer of the expandable-collapsible type such that the load spacer may be used between the load and the side walls of the container which is simple in construction, yet strong, which possesses improved reliability thereby minimizing the possibility that the load spacer will be dislodged in use, which is quickly and easily installable without the need for nailing the spacer to a side wall or suspending it by hanger wires thereby resulting in substantial time savings in installing the load spacer, which may be installed even after the load is placed in the container, and which is collapsible to a compact form for ease and efficiency of shipping.

To this end, the load spacer of the present invention includes an expandable and collapsible honeycomb structure having a top and generally planar sides which is adapted to be suspended from the top of a load with the weight of the honeycomb structure tending to elongate it in a vertical direction between the load and the side wall of the container. The load spacer is constructed from a stack of rectangular strips of sheet material which are secured to adjacent strips at spaced and staggered positions such that the strips define a honeycomb structure having a plurality of cells when expanded. A generally planar suspension member is laminated to the top of the honeycomb structure and includes portions extending laterally beyond the sides of the honeycomb structure. A score line is provided in the suspension member running along its length, the score line being located generally at one side edge of the honeycomb structure. Further, this score line is cut completely through at either end and two additional score lines are provided running perpendicularly to it from its ends to the outer edge of the suspension member. The portion of suspension member lying outboard of the long score line is bendable along this score line to a position generally perpendicular to the planar top surface of the suspension member, and the ends of this side portion are bendable inwardly along the transverse score lines and over the top surface of the suspension member to provide a pair of flaps extending perpendicularly to and inwardly of the bent side portion. The bottom edges of these flaps contact the top of the suspension member to prevent the bent side portion from being bent beyond its generally perpendicular position. A wire extends along the length of this side portion between the long score line and its outer edge. This wire is bendable, such that on bending of the flaps inwardly, the wire also bends to hold the flaps in their bent position until bent back.

In use, the load spacer is shipped in a collapsed and compact form with the suspension member lying generally across the top of the honeycomb structure. To install the load spacer, the installer simply bends the one side portion along the long score line to its vertical position perpendicular to the top surface of the suspension member. He then bends the two flaps inwardly along the transverse score lines. On bending of the flaps, the wire is also bent and holds the flaps in position. The bottom edges of the flaps contact the top surface of the suspension member to prevent the vertical side portion from being bent beyond the perpendicular. The load spacer is then cantilevered from the top of the load by means of the planar portion extending beyond the other side of the structure with the vertical side portion lying against the vertical side wall of the container. The vertical side portion lying against the vertical side wall of the container prevents the load spacer from slipping down between the load and the side wall such that the cantilevered position of the load spacer is maintained throughout use even when subjected to extreme vibration during transport of the container and load.

To reuse the load spacer, it is merely necessary to remove it from between the load and the side wall of the container, collapse the honeycomb structure, bend the flaps outwardly until they again lie in planar relation to the remainder of the vertical side portion, and then bend that side portion to its flat position. As may be seen, it is not necessary to physically attach the load spacer of this invention to the side wall of the container nor is it necessary to provide any sort of hanging wires or other suspension means to suspend the load spacer from overhead.

Among the many advantages provided by the improved load spacer of this invention are the simple procedure for installing the load spacer, the substantial time savings over prior art systems in installing the load spacer, the fact that the spacer can be placed in position after the load is in position whereby the installer can readily see what width load spacer is needed, the elimination of external hanging means, the compactness of the load spacer in its collapsed condition providing for ease and efficiency of shipping stacks of load spacers, and the ease with which it can be removed and collapsed after use and then reused.

These and other objectives of the present invention will become more readily apparent from the following detailed description of the invention taken in conjunction with the accompanying drawings.

BRIEF DESCRIPTION OF THE DRAWINGS

FIG. 1 is a perspective view partly in section of a typical load arrangement illustrating the application of the load spacer of the present invention.

FIG. 2 is a fragmentary perspective view of the load spacer of the present invention shown in FIG. 1.

DETAILED DESCRIPTION OF THE INVENTION

Referring now to FIG. 1, in a typical load arrangement for shipping unit containers or articles of freight, stacks of articles of freight 10 are placed on the floor 12 of a shipping vehicle such as a railway boxcar having vertical end and side walls (hereinafter referred to collectively as "side walls"), portions of these walls being designated in FIG. 1 by the number 14. The stacks 10 are separated from each other and from the walls of the shipping container by generally planar spaces 16. A center load spacer 18 which is generally an expandable and collapsible honeycomb structure is positioned between the spaced stacks of articles of freight 10 to prevent sideways shifting of these loads. As shown in FIG. 1, the side load spacers 20 of the present invention are placed between the articles of freight 10 and the side walls 14 of the shipping container with the honeycomb structure 22 extending downwardly and filling the void 16 therebetween. As is well known, such honeycomb structures are very strong in a direction transverse to the planar sides thereof.

Referring now in addition to FIG. 2, the honeycomb structure 22 of the side load spacer 20 is formed of a stack of rectangular strips of sheet material 24 which are secured to adjacent strips at spaced and staggered intervals, as at 26 as, for example, by gluing the strips together. The sheet material is preferably formed of chipboard but may be other material, for example, paperboard either corrugated or uncorrugated. The width of the glue line is indicated by the designation "w" in FIG. 2. When the stack of strips of sheet material is expanded, the sheet material 24 therefore defines a vertical and horizontal array of adjacent cells 27 having the generally honeycomb cellular configuration, a top 28 and generally planar sides 30 and 32. The number and size of strips used in the spacer is a matter of choice. Typically, a sufficient number of strips are used to permit the spacer to expand to fill a void six to eight feet high. A convenient width is about 8 inches and a convenient length is about 48 inches.

The side spacer 20 includes a suspension member 34 laminated to the top strip 28 of the stack of strips. This suspension member is a generally planar member again formed of a suitable material such as chipboard or paperboard either corrugated or uncorrugated and includes one side portion 36 extending laterally beyond one of the planar sides 30 of the stack of strips of sheet material forming the cellular configuration and a second side portion 38 extending laterally beyond the other side 32 of the honeycomb structure 22. A score line 40 is provided in the suspension member 34 generally at the top edge of the side 32 of the honeycomb cellular structure 22. The score line 40 runs along a portion the length of the second side portion 38, however, a length at either end is cut completely through the material, for example, by die cutting, as illustrated at 42. Where the die cut portions 42 meet, the ends of the longitudinal score line 40, the second side portion 38 is also scored in a transverse direction as at 44, thus defining a center section 46 and two end portions referred to hereinafter as flaps 48. The score line 40 permits the center section 46 to be bent in an upward direction (illustrated by the arrow in FIG. 2) to a generally vertical position wherein that section is generally perpendicular to the planar top surface of the suspension member 34 (FIG. 1). Further, the transverse score lines 44 permit the flaps 48 to be folded inwardly to the position shown in FIG. 1 wherein the flaps 48 lie generally perpendicular to the upwardly bent center section 46 and also to the top surface of the suspension member 34. A wire 50 (shown in phantom) such as a 12 gauge mild steel wire, which is easily bendable by hand, passes through the center of the side portion 38 and extends longitudinally therealong from edge to edge. When the flaps 48 are bent inwardly, the wire 50 is likewise bent and serves to maintain the flaps in their folded position during use.

The advantages of the present invention can be appreciated by the few simple steps needed to install the load spacer. Once the load is in place, the installer merely bends the side portion 38 along the score line 40 into its upward and vertical position. He then bends the flaps 48 inwardly along the score lines 44 to a position wherein they are generally perpendicular to the center section 46 of the side portion 38. He then places the load spacer in the void 16 with the side portion 36 resting on the top of the load 10 and the center section 46 lying against the side wall 14. The honeycomb structure 22 is then permitted to expand downwardly by gravity or the installer may assist in its expansion by pulling it downwardly. With these few simple steps, the load spacer has been installed.

As may be seen in FIG. 1, the side load spacer 20 is suspended from the top of a load 10 by resting the side portion 36 of the suspension member 34 on the top of the load 10 with the side portion 38 being in its inwardly bent position and the flaps 48 being bent inwardly over the top surface of the suspension member. The center section 46 of the side portion 38 then lies against the vertical side wall 14 of the container to prevent the load spacer from slipping down between the load and the vertical side wall 14 as would otherwise occur due to vibration of the load and load spacer during use. Moreover, it will be appreciated that the inwardly bent flaps 48 prevent the center section 46 from passing beyond the perpendicular or being folded down onto the top face of the suspension member 34. Thus, the flaps 48 serve as a means to maintain this center section 46 in its generally perpendicular position during use. As set forth above, the bent wire 50 maintains the flaps in the desired position.

It may be further appreciated from FIG. 1 that the load spacer of the present invention does not require any overhead suspension means and may be placed between the side wall of the container and the load after the load is in place. This permits the user to select a load spacer of proper width since he can readily observe the width required after the load is placed in the container.

After use, the load spacer 20 may be easily collapsed for storage by simply removing it from its position in the container, collapsing the honeycomb structure 22, folding the flaps 48 outwardly to a position wherein their surfaces are planar to the surface of the center portion 46 and then folding that center portion downwardly such that the entire top surface of the suspension member is again planar. This permits a number of load spacers to be stacked one upon another for convenient, efficient, and compact shipping or storage.

Although the invention has been described in terms of certain presently preferred embodiment, it will be appreciated that other forms could be adopted while achieving many of the advantages of the present invention. For example, instead of employing the flaps, it is possible to place wires in a direction transverse to that shown in FIG. 2 with the wires extending across the score line such that when the side portion is bent in an upward position the wires tend to maintain it in that position. Similarly, the wire 50 could be eliminated by provision of tabs on the flaps 48 which would be captured in slots in the suspension member to hold the flaps in place.

I claim:

1. A side load spacer adapted to be removably suspended from the top of a load laterally spaced from the vertical side wall of a container comprising:

an expandable-contractible cellular structure having a top and a pair of generally planar sides, a suspension member laminated to said top of said cellular structure, said suspension member having a generally planar top surface and including a first side portion extending beyond one of said sides of said structure and a second side portion extending beyond the other of said sides of said structure, said second side portion being bendable to a position generally perpendicular to said top surface of said suspension member, and means for maintaining said second side portion in said generally perpendicular position comprising at least one flap formed in said second side portion of said suspension member, said flap being bendable to a position overlying the top surface of said suspension member with an edge thereof contacting said top surface in said bent position, whereby said load spacer is suspendable by said first side portion from the top of said load with said second side portion lying against the vertical side wall of said container.

2. The side load spacer of claim 1 wherein said means comprises a pair of flaps bendable to a position generally perpendicular to the remainder of said second side portion.

3. The side load spacer of claim 2 wherein said suspension member is scored along a longitudinal line to facilitate bending of said second side portion and wherein said each said edge of said flaps is formed by cutting through the suspension member along a line extending from each end of said longitudinal score line.

4. The side load spacer of claim 3 further comprising a pair of transverse score lines in said second side portion to facilitate bending of said flaps.

5. The side load spacer of claim 2 wherein said means further comprises a wire extending along the length of said second side portion and into said flaps, said wire being bendable on bending of said flaps to maintain said flaps in their bent position.

6. The side load spacer of claim 1 wherein said suspension member is scored to facilitate bending.

7. The side load spacer of claim 1 wherein said means for maintaining said second side portion in said generally perpendicular position comprises a wire which bends on bending of said second side portion and stays in its bent position until bent again.

8. The side load spacer adapted to be removably suspended from the top of a load laterally spaced from the vertical side wall of a container comprising:

an expandable-contractible cellular structure having a top and a pair of generally planar sides, said structure being formed of a stack of rectangular strips of sheet material, the strips of sheet material being secured to adjacent strips at spaced and staggered positions such that the strips define said structure having a plurality of cells when expanded, a suspension member laminated to the top strip of said stack of rectangular strips of sheet material, said suspension member being generally planar and substantially rigid and including a first side portion extending beyond one of said sides of said cellular structure and a second side portion extending beyond the other of said sides of said cellular structure, said second side portion including a center section and a flap at each end of said center section, the surface of said suspension member being scored along a line located generally at the said other side of said cellular structure to permit bending of said center section of said second side portion upwardly to a position generally perpendicular to the top surface of said suspension member, and a wire extending along the length of said second side portion including the length of each said flap, each said flap being bendable with respect to said center section of said second side portion to a position overlying the top surface of said suspension member with an edge thereof contacting said top surface, said wire being bendable on bending of said flaps to maintain said flaps in their bent positions, whereby said load spacer is suspendable by said first side portion from the top of said load with said second side portion lying against the vertical side wall of said container without physical attachment of said load spacer either to said load or to said side wall of said container.

* * * * *

UNITED STATES PATENT AND TRADEMARK OFFICE
CERTIFICATE OF CORRECTION

PATENT NO. : 4,386,881
DATED : June 7, 1983
INVENTOR(S) : Henry L. Liebel

It is certified that error appears in the above-identified patent and that said Letters Patent is hereby corrected as shown below:

In column 5, line 24, "inwardly" should be --upwardly--.

In column 5, line 59, "embodiment" should be --embodiments--.

Signed and Sealed this

Twentieth Day of September 1983

[SEAL]

Attest:

GERALD J. MOSSINGHOFF

Attesting Officer   Commissioner of Patents and Trademarks